United States Patent [19]

Ljusberg et al.

[11] Patent Number: 5,747,089
[45] Date of Patent: May 5, 1998

[54] METHOD OF MAKING MOLASSES PRODUCT HAVING LOW HYGROSCOPICITY AND SUFFICIENT NON-CAKING PROPERTIES

[75] Inventors: Helena Ljusberg, Höllviken; Kerstin Pehrson, Löddeköpinge, both of Sweden

[73] Assignee: Danisco Sugar AB, Malmö, Sweden

[21] Appl. No.: 464,717

[22] PCT Filed: Dec. 22, 1993

[86] PCT No.: PCT/SE93/01101

§ 371 Date: Jun. 23, 1995

§ 102(e) Date: Jun. 23, 1995

[87] PCT Pub. No.: WO94/14982

PCT Pub. Date: Jul. 7, 1994

[30] Foreign Application Priority Data

Dec. 23, 1992 [SE] Sweden ................. 9203901

[51] Int. Cl.⁶ .................................................. A23L 1/015
[52] U.S. Cl. .............. 426/478; 426/487; 426/490; 426/658; 127/55; 210/650; 210/651; 210/653; 210/654
[58] Field of Search .................... 210/650, 651, 210/653, 654, 431; 127/55; 426/658, 478, 487, 490

[56] References Cited

U.S. PATENT DOCUMENTS

| | | | |
|---|---|---|---|
| 1,983,434 | 12/1934 | Black et al. | 127/55 |
| 4,519,845 | 5/1985 | Ou | 127/55 |
| 4,523,999 | 6/1985 | Toyoshi et al. | 127/55 |
| 4,717,425 | 1/1988 | Lefebvre | 127/55 |
| 5,145,584 | 9/1992 | Swamikannu | 210/650 |
| 5,454,875 | 10/1995 | Clarke | 127/55 |
| 5,454,952 | 10/1995 | Brewer | 210/650 |

OTHER PUBLICATIONS

Bugayenko et al. "Study of high–molecular weight compound in cane sugar industry" 1986.
WPI Abstract 0177708/5, Some observations on the high molecular weight colorants in sugar, Robert et al, Cane Sugar Refining Res. Project, Inc., USA, 1979, pp. 66–80.
WPI Abstract 07648615/7. "Decolourizing of molasses—by diluting heat–clarifying treating with invertase and permeating trough ultrafiltration or reverse osmosis membrane", JP 63–207400, Aug. 26, 1988.
WPI Abstract 0193609/5, Comparison of different methods for determination of dry solids content of sugar syrups of varying purity, Zuckerindustrie 1980, 105 (5) 451–456.

*Primary Examiner*—Lien Tran
*Attorney, Agent, or Firm*—Birch, Stewart, Kolasch & Birch, LLP

[57] ABSTRACT

A process for manufacturing a high molecular weight molasses product having improved drying properties, which includes: feeding starting material molasses having a RT value of 8–45% and a color of at least 100.000 ICUMSA units to a membrane filtering plant (apparatus) having an inert membrane having a nominal cut off value of at least 2.000 dalton; and filtering a low molecular weight fraction as a permeate from a high molecular weight fraction as a retentate, and collecting the high molecular weight fraction having a color of at least two times the color of the starting molasses or at least 200.000 ICUMSA units.

10 Claims, No Drawings

METHOD OF MAKING MOLASSES PRODUCT HAVING LOW HYGROSCOPICITY AND SUFFICIENT NON-CAKING PROPERTIES

The present invention refers to an industrially applicable process for the manufacturing of a membrane filtrated molasses product having improved properties. The molasses product obtained thereby can accordingly be spray-dried as well as used for the manufacturing of dried foods, especially brown sugar. The molasses product can also be used as a colour and/or flavour giving ingredient within the food or soft drink industry, especially for low-calorie products. The dried foods obtained by using a molasses product of the invention are free-flowing and have a reduced tendency to cake.

It has for long been a problem to be able to dry molasses containing foods industrially and get a free-flowing product which does not aggregate in the manufacturing apparatus or in the final package. It has in particular been hard to produce a spray-dried molasses only containing sugar plant raw materials to be used as an ingredient in food dry mixtures.

Molasses stands for the non crystallisable syrup or viscous juice which is obtained as a by-product in the industrial manufacture of sucrose from a concentrated solution obtained from sugar-cane, -beet or unrefined sugar. At all times one has tried to extract the highest possible amount of white sugar from said molasses. In order to achieve a higher degree of utilization of the sugar it is known to concentrate the molasses in different ways, for instance by membrane filtration.

Molasses can also be used as a colour and flavour giving ingredient within the food industry; this especially applies to cane sugar molasses. There are a lot of different types of molasses which are characterized either by the way they have been obtained or by the intended use. Molasses always gives a certain sweetness, which in general decreases the darker the colour. The flavour is complex, varying between candylike sweet and strong, having a slightly bitter, sometimes liquo-ricelike tinge. Molasses can for instance be used for masking less pleasant flavours or to enhance the own flavour of a product. As mentioned molasses also gives foods, especially articles of bakery, a characteristic colour, from golden brown to dark brown, and can be used as a colour improving agent or masking agent to disguise grey shades.

In order to give a microbiologically stable product in storing, molasses has to contain almost 80% dry matter. At this high content of dry matter the viscosity of the product will be very high, and the molasses becomes a very viscous liquid which is hard to handle. An alternative to a concentrated solution of molasses is a dried molasses solution, also called dry molasses. In general it is, however, very difficult and expensive to spray-dry molasses owing to the content of crystallization inhibiting substances, which require the use of different carrier materials.

Drying is a conventional way to produce food of extended keeping qualities. In spray-drying a concentrate of the product to be dried is sprayed in the form of fine liquid particles into an air stream which evaporates the liquid phase. For products that partially are based on a content of molasses this drying normally brings about caking of the molasses in the apparatus used, which prevents an effective use thereof and requires regular cleaning. In addition the dried product is sensitive for humidity, which brings about that it has to be kept in an air and moisture proof way, for instance in unopened aluminium foil or plastic packages.

In ultrafiltration, a type of membrane filtration, of a solution molecules which are larger than the pores of the ultrafiltration membrane are separated from the solvent and small molecules solved therein. The separation process requires pressure and is utilized as a fractionating and concentrating method. The flow through the membrane per unit of time is called flux and is defined below. The part of the added solution which passes the membrane is called permeate and the part which does not pass through the membrane is called retentate, reject or concentrate. The flux can be defined as follows $$\text{Flux} = \frac{\text{total amount through the membrane}}{\text{membrane area} \times \text{time}} \quad (\text{l/m}^2\text{h})$$

It is known to refine optionally diluted molasses by ultra-filtration or membrane filtration. Bichsel, S. E. and Levad, J. A. discuss in Journal of the American Society of Sugar Beet Technologists,16 (1970) 3, p 197–206, the possibility of using ultrafiltration through a membrane in order to desalt and decolour diluted molasses. In using fibre capillaries having a critical pore diameter, the molecules of the smallest size will be able to pass through said pores forming a permeate while the retentate is composed of the remaining, partially fractionated molasses product. In desalting the permeate will consist of a salt containing liquid and in decolorizing and use of different conditions the high-molecular coloured compounds remain in the retentate which subsequently can be discarded as the sugar is transferred into the permeate. The purpose of the refining, performed step-by-step, is to extract an additional amount of sugar from the molasses. It is concluded that refining of this type is not yet economically competitive.

It is known to separate molasses into a high-molecular and a low-molecular fraction by membrane filtration, see for instance Kofod Nielsen et al, Sugar Technology Reviews, 9 (1982), p 59–117, wherein the low-molecular part, the permeate, comprises the major part of the sugar of increased purity, while the concentrate consists of more high-molecular compounds of an increased colour.

Another problem has been to provide flavour and colour rich brown sugar which is less hygroscopic, that is which does not cake after being left in the air for some time.

Brown sugar (farinsocker) is according to the statute book of Statens Livsmedelsverk (SLV FS 1979:9) a product containing only natural constituents of sugar plant raw material, that is sugar cane or sugar beet, but having a smaller amount of sucrose than sugar. Sugar shall according to the same statutes, contain at least 99.5 g sucrose per 100 g. Brown sugar is used in the bakery and confectionery business for making articles of bakery and other foods owing to the characteristic colour and flavour substances. So called brown sugar (brunt socker) is a more general concept comprising in addition to brown sugar different mixtures thereof with other components, as well as other brown sugar products.

Brown sugar was originally prepared from the molasses obtained in refining sugar from sugar-cane in several steps, but this process gave a bad yield and the final product of differing quality depending of the starting material. Therefore brown sugar is today industrially manufactured from particles of white, refined sugar, from beets or sugar-cane, which are sprayed with molasses from cane sugar so that the sugar particles will be surrounded by a thin layer of molasses. Depending on the molasses brown sugar of different qualities is obtained having a colour varying from light to dark brown.

A disadvantage with brown sugar made according to the processes above is the moisture sensitivity and the tendency to cake to a product which is hard to distribute and not free-flowing after having been in contact with a varying air humidity. In order to overcome said disadvantages different methods have been tested.

U.S. Pat. No. 2,910,386 relates to the production of a free-flowing granular brown sugar, which has been obtained by coating an ordinary brown sugar having a sticky surface of molasses after drying with a small amount, 1–10%, of a comparatively non-hygroscopic pulverulent material and subsequent drying in order to convert the molasses layer into a dry solid layer. As a coating material has been used one or more non-hygroscopic, solid materials such as starch, flours, sugar or proteins.

U.S. Pat. No. 3,615,699 also relates to a method for preparing a brown sugar which does not cake or become crusty upon standing. In this case one starts from a conventional sticky brown sugar which is mixed with a finely divided water-insoluble wood cellulose, micro-crystalline cellulose or other cellulose as a cakereducing agent.

According to the Swedish patent application SE 8902632-2 granulated sugar is first mixed with molasses and then granules of a separating agent such as powdered sugar or maltodextrin are added to the molasses containing granulated sugar. This separation agent constitutes about 8–27% by weight of the brown sugar.

However, in many applications an addition of a substance foreign to sugar products to the molasses layer, which of course brings about a not asked for change of the flavour and the colour of the final product, will involve a deterioration of the product characteristics. An addition of maltodextrin to brown sugar for instance implies that this brown sugar cannot be used for making ginger bread dow from traditional recipes. It is therefore a wish to be able to provide a process for producing brown sugar which makes it possible to achieve a storable, less hygroscopic, free-flowing product preserving the characteristic properties of brown sugar in different applications.

It has now surprisingly been found that by membrane filtration of molasses a product of improved colour and flavour can be obtained, which can be spray-dried and when dry has a sufficiently low hygroscopicity not to cake. A use thereof as an ingredient in food to be dried, for instance to a powder for cake mixes or to brown sugar, will give the dried products an improved quality and storability.

The present invention refers to a process for the manufacturing of a molasses product having improved drying properties, which is characterized in that a molasses used as a starting material having an RT value of 8–45% (RT value refers to refractometric dry substance, i.e. the content of dry substance obtained by refractometric determination according to methods conventional within the sugar industry) and a colour of at least 100,000 ICUMSA units is added to a membrane filtration plant having an inert membrane with a nominal cut off value of at least 2,000 dalton and is filtrated under such temperature and flow conditions that, at the same time as a low-molecular fraction is separated as a permeate, a high-molecular fraction maintained as a retentate obtains a colour of at least twice the colour of the starting molasses, i.e. of at least 200,000 ICUMSA units.

Chemically molasses mainly consists of different sugars, such as sucrose, invert sugar such as glucose and fructose, water and salts (ash). In addition can be mentioned minor amounts of polysaccharides and other carbohydrates, nitrogenous compounds, acids, waxes, sterols and phosphatides. Depending on the composition the physical properties of the molasses vary and especially the viscosity. The industrially supplied molasses normally has a RT value of about 75–80% and a colour according to ICUMSA of 75,000–450,000. In order to be industrially membrane filterable according to the invention it is, however, of importance that the molasses is not too concentrated. It is preferred to use a molasses solution having a RT value of 10–20%, especially 11–15% by weight, which can easily be obtained by dilution with water. The molasses solution used as the starting material should preferably have a colour of at least 180,000 ICUMSA units for the manufacturing of brown sugar.

Colour is within the sugar industry measured in ICUMSA units, expressing the absorbancy index for a specific sugar solution at a certain wave length times 1,000. The method for measuring colour according to ICUMSA is described in Cane Sugar Hand Book, ed. J. P. C. Chen, Wiley & Son, 11th ed., p. 744 ff. For molasses and darker solutions the colour is calculated as follows $$Colour = (1,000 \times 100 \times dilution \times absorbancy\ at\ 420\ nm)/RT$$

wherein RT refers to refractometric dry substance for the sample and dilution refers to the dilution of the solution, normally 200 times.

By membrane filtration of molasses according to the invention you will get a less hygroscopic product which can be used for making spray-dried articles of food. This is supposed be due to the fact that a part of the so called crystallization inhibiting substances which are present in molasses is removed. This refers to among other things different mixtures of mono and disaccharides, such as glucose, fructose, sucrose and salts. The membrane filtration of molassses according to the invention will also give a reduction in the calorie content. Caking of powder or crystals within the sugar industry can be ascribed to a surface against air on the solid material which is coated with a high viscous syrup or has an amorphous structure. The syrup is a partially inverted sucrose solution containing mineral salts and can have a RT-value of up to above 80%. This means that substances tending to form syrup are removed by filtration. In order to obtain a sufficient separation of said low-molecular molecules by membrane filtration it is necessary to use a membrane having a nominal cut off value of at least 1,000 dalton and to filtrate under such conditions that the colour of the concentrate is increased at least twice. That the membrane has a cut off value of 1,000 dalton means that the major part (90–95%) of those substances having a molecular weight higher than 1,000 cannot pass through the membrane but are retained thereon, the high-molecular substances in molasses are concentrated at the same time as low-molecular substances are separated in a corresponding amount. It could not be predicted that by removing this amount of low-molecular substances from molasses a molasses product should be obtained which could be spray-dried or which can give a free-flowing brown sugar. It should be noted that the membrane material and not only the size of the pores has an effect on the real cut off value. Membranes having cut off values between 1,000 and 20,000 all give a reduction of the low-molecular substances in the molasses. Too high cut off values, however, bring about a bad separation of the molasses as too much passes through. On the other hand a too low cut off value will give too low a flux. In order to obtain an industrially applicable flux it is necessary to have a lowest cut off value of 2,000 dalton. A cut off value of 5,000 or higher will give a surprising increase of the flow over the membrane at a pressure of 10 bar, as is shown in the example below. Thus the nominal cut off value of the membrane should preferably be at least 5,000 dalton.

By continuing the membrane filtration until the colour of the concentrate is about 2.5–3.0, especially 2.8 times the colour of the starting molasses a preferred molasses product for the manufacturing of brown sugar is obtained. The separated amount of low-molecular substances will then be sufficient for the obtained molasses product to show sufficiently reduced hygroscopicity. A further concentration will hardly give an improvement of the drying properties of the product but only an unnecessary loss of product.

Alternatively the progress of the membrane filtration can be measured by analysis of the content of fructose in the concentrate. The membrane filtration should then continue until the content of fructose has been reduces to a third, preferably to half the amount. The content of fructose is analyzed by means of HPLC.

For the runnability in industrial scale it is also crucial to have a high flux together with a maintained good separation ability over the membrane, which is expressed by means of the retention value (RET); it should also be possible to run a number of cycles without, after washing, the flux of clean water through the membrane being materially changed. A membrane having a cut off value below about 1,000 will consequently not give a sufficient flux to be industrially applicable. Suitable conditions for the membrane filtration comprises use of a compared to ambient temperature slightly increased temperature such as from 45° C., and a pressure of about 10 bar. The upper limit for the temperature is given by each membrane material respectively. For instance a membrane of polyether sulfone having a cut off value of 8,000 functions well at a temperature of about 50° C. and a pressure of 15 bar.

The membrane material too is of importance for the filtration; it is essential for an industrial process that the filter is not stopped up, but the membrane is inert in the filtering medium. Several different types of membranes of polymeric material can be used in accordance with the invention. Cellulose membranes have, however, been regarded as being less appropriate as being more sensitive for high temperatures and extreme pH values, which makes the membranes harder to handle for instance in washing. Suitable membrane materials have turned out to be aromatic polysulfones, aromatic polyamides and polyethersulfone.

Membrane filtration today can be performed with a number of different types of membrane constructions, for instance membranes in the shape of plates, tubes, spirals or hollow-fibres. It is not decisive of the idea of the invention which type of membrane filtration plant that is used.

The invention also refers to a molasses product obtained by the above process, and use thereof for the manufacture of the spray-dried product. The spray-dried product can be a so called dry molasses, i.e. a molasses product which has been dried to a free-flowing dry powder, and can be used as such. The spray-drying can be performed in a conventional way by means of every known type of device without the apparatus plugging.

The molasses product of the invention can also lend itself to the production of different dried articles of food which are based on a liquid mixture of different ingredients which are then subjected to a spray-drying process as above. A powdered product which is free-flowing and not caking is obtained. As an example of dried powdered foods can be mentioned cake mixes.

The invention also relates to the use of a molasses product of the invention for the production of brown sugar by treating refined sugar therewith. In industrial manufacture granulated sugar is fed to a mixing device, to which under stirring molasses, preferably heated to a temperature of 50°–70° C., in an amount of 1–5% by weight of a total weight of the brown sugar, is sprayed through the system of nozzles. A suitable mixing device is a through mixer having double, contra rotating shafts carrying paddles, but of course any mixer giving a sufficiently intimate mixture of sugar and molasses without damaging the sugar crystals can be used. Methods for preparing brown sugar and adequate devices therefore are for instance described in the patent U.S. Pat. No. 2,910,386 and SE 8902632-2 stated above.

WORKING EXAMPLES

Example 1

Membrane filtration of molasses in the laboratory

The aim of this experiment was to test if it was practically possible to perform membrane filtration and get a product having improved drying properties. The membrane filtration module used was DDS Mini Lab 10 (from De danske sukkerfabrikiker), which can be provided with different interchangeable membranes. The module was introduced into a circuit which in addition comprised a tank for molasses solution and a pump. The circuit was not provided with a heat exchanger, and consequently added pump energy brought about that temperature of the solution was gradually increased. The flux increases about 2%/°C. The experiments were performed at a constant concentration, i.e. the permeate was recycled to the concentrate container. The membrane area was too small in proportion to the volume in circuit for a concentration of the molasses to be possible.

The following membranes were tested:

| Producer, designation | Material | Cut off, molecular weight |
|---|---|---|
| DDS GR 61 | polysulfone | 20,000 |
| DDS GR 81 | " | 6,000 |
| DDS GR 90 | " | 2,000 |
| Hoechst Nadir PA 5 | aromatic polyamide | 5,000 |
| Hoechst Nadir PES 4 | polyethersulfone | 4,000 |
| Hoechst Nadir PES 8 | " | 8,000 |
| Hoechst Nadir PS 4 | polysulfone | 4,000 |

Two different dilutions, different pressure and membranes having different cut off values were tested. The dilutions used gave a RT value of 45 and 33%, respectively, in the feed. As a starting molasses was used refinery molasses having a colour of 83,700. RET refers to the retention of colour and sugar respectively, i.e. 1-Cp/Cr, wherein Cp is the concentration in the permeate and Cr the concentration in the retentate.

| Test | Membrane | Pressure bar | Temperature °C. | RT % | Flux l/m² h | RET colour | RET sugar |
|---|---|---|---|---|---|---|---|
| 1A | GR 81 | 2.5 | 38 | 45 | 3.7 | 0.62 | 0.37 |
| 1B | GR 81 | 4.5 | 49 | 45 | 8.9 | 0.64 | 0.07 |
| 2 | GR 81 | 6.5 | 38 | 33 | 9.3 | 0.74 | 0.14 |
| 3 | GR 90 | 6.5 | 48 | 33 | 10.9 | 0.85 | 0.12 |
| 4 | GR 61 | 6.5 | 50 | 33 | 21.4 | 0.7 | 0.06 |
| 5 | PS 4 | 6.5 | 53 | 33 | 8.0 | 0.84 | 0.08 |

GR 90 and PS 4 show the best retention properties. They have a high colour retention and a low sugar retention which is desirable. GR 61 has a high flux which is desirable, but a low colour retention.

Example 2

Test of membranes in membrane filtration of molasses in the laboratory

In a DDS 35-2.25 module (from De danske sukkerfabrikker) in a circuit similar to the one in example 1 the following membranes were tested: GR 90 (1.35 m²), PES 4 (0.15 m²), PA 5 (0.15 m²) and PES 8 (0.15 m²) at a pressure of 6 and 10 bar respectively. The used molasses had a colour of 83,700 and was diluted to a sugar content of 30.8% (RT). The filtration was performed at 50° C.

| Membrane | Pressure bar | Sugar in the permeate, % | Flux l/m²h | RET colour | RET sugar |
| --- | --- | --- | --- | --- | --- |
| GR 90 | 6 | 27.0 | 8.0 | 0.83 | 0.12 |
| GR 90 | 10 | 26.5 | 9.3 | 0.86 | 0.14 |
| PES 4 | 6 | 27.4 | 8.7 | 0.87 | 0.11 |
| PES 4 | 10 | 26.0 | 11.2 | 0.91 | 0.18 |
| PA 5 | 6 | 27.4 | 11.5 | 0.89 | 0.11 |
| PA 5 | 10 | 26.4 | 15.5 | 0.92 | 0.14 |
| PES 8 | 6 | 27.6 | 20.0 | 0.87 | 0.11 |
| PES 8 | 10 | 27.6 | 39.1 | 0.9 | 0.1 |

It should be noticed that the flux of the PES 8 increases significantly when the pressure is increased. PES 8 also gives a good result when it comes to sugar and colour retention. It is desirable to have a high flux, a high retention of colour and a low retention of sugar.

Example 3

Optimizing pressure in membrane filtration of molasses in the laboratory

In the same plant as in Example 2 above molasses having a colour value of 230,000 was membrane filtrated at 50° C. through a PES 8 membrane from polyethersulfone having a cut off value of 8,000, at different pressures. The RT-value of the filtrated molasses was about 12%. The flow through the membrane and the retention of colour and sugar were recorded. The results obtained are stated in the table below.

| Pressure, bar | Flow, l/m²h | RET, sugar | RET, colour |
| --- | --- | --- | --- |
| 7 | 43 | 0.30 | 0.87 |
| 11 | 47 | 0.42 | 0.91 |
| 15 | 66 | 0.45 | 0.91 |

From this can be seen that an increase of the pressure from 11 to 15 bar will give a strong increase of the flow through the membrane.

Example 4

Industrial membrane filtration of molasses

In a pilot plant from DOW having a membrane area of 4.5 m² and provided with a Nadir PES-8 filter as above a number of experiments were performed in order to optimize pressure, temperature and concentration of the fed molasses solution aiming at producing a retentate which is easily dried and has a colour and flavour characteristic for molasses. A bag filter was mounted in front of the membrane filter to remove particles (100 μm). During the filtration a temperature of 50° C. was used. The filtration can be operated continuously or in batch and the fed product had a concentration of 13% (RT). The membrane was of polyethersulfone type having a nominal cut off value of 8,000 dalton.

1900 kg molasses was membrane filtrated in the plant increasing the colour value from 230,000 to 650,000 after 11 hours. The pressure was 14.5 bar during the run and the plant was run in a semi-batch arrangement, i.e. in the beginning of the run the amount of permeate which was pressed through the filter was replaced by new "feed". This means that pre-treatment, filtering through bag filter and washing of the plant can be made in two shifts.

Example 5

Analysis of molasses before and after membrane filtration

Molasses which has been membrane filtrated at a pressure of 11.5 bar in the plant of Example 4 to a final colour of 629,000 (the colour of the starting solution 218,000) and from a RT value of 13% to 32% gave the following HPLC analysis:

|  | Before | After |
| --- | --- | --- |
|  | membrane filtration in % of RT | |
| High-molecular | 38.3 | 61.6 |
| Trisacharides | 1.8 | 2.6 |
| Sucrose | 33.4 | 24.5 |
| Glucose | 9.8 | 4.2 |
| Fructose | 13.9 | 5.6 |
| Additional | 2.8 | 1.5 |
| Ash content | 12.3 | 6.73 |

Example 6

Spray-drying of membrane filtrated molasses

Molasses obtained in accordance with Example 4 was dried on a single stage pilot spray-drier having a coned bottom. Entering temperature: max 158° C. Leaving temperature: max 82° C.

The molasses samples were easy to dry and there were no problems with aggregation in the apparatus.

The dry molasses obtained is a free-flowing powder which can easily be mixed with other powdered food ingredients. When water is added a more or less viscous solution is obtained having a flavour and colour characteristic of molasses.

After storing for 6 months in a polyethylene bag at ambient temperature the dry molasses was still free-flowing and had a content of dry matter, TS of 97%.

Example 7

Production of brown sugar

Brown sugar was produced from sugar and molasses according to a conventional process in which sugar at ambient temperature was fed into a mixer to which the stated amount of molasses was dosed subsequently under stirring. Different ways of dosing the molasses were tested. In this connection was used molasses having an RT=72%, as well as a molasses diluted to a RT=50%. The molasses was either sprayed through a system of nozzles or was allowed to flow in a continuous jet. The molasses had a temperature of between 20° and 60° C. at the dosage. When molasses having a RT of 72% was used the molasses had to be heated to about 60° C. in order to be uniformly distributed. If the molasses is diluted to some extent it will be possible to achieve a uniform distribution without or by a moderate heating. Nozzling will give a better distribution but has not been necessary in the laboratory to give a good product.

To be able to find out in what way the sugar quality and the addition of molasses influence the obtained brown sugar a series of tests in the laboratory were performed according to following receipt

| Test | Sugar quality (granular size) | Molasses addition % | Molasses quality | Colour |
|---|---|---|---|---|
| 2 | K5 | 2.5 | | beige |
| 3 | K5 | 3.0 | * | dark brown |
| 4 | K5 | 2.5 | ** | brown |
| 5 | K5 | 3.0 | ** | dark brown |
| 6 | K4 | 3.0 | ** | dark brown |
| 7 | K6 | 3.0 | ** | brown |
| 8 | K6 | 4.0 | ** | dark brown |

* membrane filtration to twice the colour
** membrane filtration to three times the colour
K4 refers to an average crystal size of 0.65 mm, K5 to an average crystal size of 0.45–0.55 mm and K6 to a particle size mainly of 0.10–0.40 mm (granulated sugar).

The brown sugars obtained were dried in a small fluidized bed as well as in a warming cupboard at 50° and 90° C., respectively, as well as at ambient temperature. When the samples were dried in a warming cupboard and at ambient temperature frequent stirring was required for the product not to cake. The obtained samples were also tested as to storage stability.

Sample 3 with membrane filtrated molasses the colour value of which had been increased two times could be dried without any problems, but had a certain tendency to take up moisture. Sample 2 made on non filtrated molasses (the same molasses which after membrane filtration was used in sample 3) in a somewhat smaller amount to be able to dry, could be dried, but the product was only light brown and almost immediately took up moisture again.

The samples 4–8 with a second membrane filtrated molasses could be dried both at 90° C. and 50° C. and at ambient temperature. In a drying plant it should be possible to use a higher temperature if the residing time is so short that the sample will never reach said temperature. The K6 samples were most easy to dry, but required a somewhat larger addition, i.e. 4%, to give a dark brown product. The K4 sample required the longest time. None of these samples showed any tendency to take up moisture after being kept in open pots for about a week at normal humidity and ambient temperature.

In a pilot plant and also in large scale brown sugar samples have been mixed in a mechanical mixer into which, directly after the mixing, warm air has been blown in making the samples to dry directly in the mixer. All drying processes have given a free-flowing, storage stable product.

In a tasting test of the samples 4 and 5 there was a preference for sample 5.

Example 8

Tasting test of a brown sugar solution

In order to compare the flavour of different brown sugars the following test was performed.

Samples of a 40% solution of two different types of commercial brown sugars, i.e. "Farinsocker" produced in a conventional way from ordinary molasses and sugar and without other additives, and "Brun farin" produced from sugar and ordinary molasses, but with icing sugar and maltodextrin added to prevent caking, were compared with a sample of the 40% solution of the brown sugar produced from sugar (K5) 96% by weight, a molasses which had been membrane filtrated as above (colour 649.000, RT=50%) 4% by weight and salt 0.04% by weight i a mechanical mixer and dried in hot air under stirring. "Farinsocker" and "Brun farin" are marketed by Svenska Sockerbolaget AB.

The taste of the test solutions were tested by a taste panel consisting of 22 people and rated according to a scale of 1–9, wherein 1 stands for "disgusting" and 9 stands for "very good". The results are summarized in the table below.

| Sample | Value |
|---|---|
| "Farinsocker" | 5.2 |
| "Brun farin" | 4.6 |
| Brown sugar made from membrane filtrated molasses | 5.8 |

Example 9

Comparative example

In this example caking of different qualities of brown sugar was tested after storage for one day at normal ambient moisture and temperature. The brown sugar samples were made in accordance with example 7 from sucrose and 2.5% molasses (RT=80%) and were spread on a paper for drying, and subsequently kept for the stated period of time. They were then poured through a sieve (2.92 mm). The weight of the sample as well as the weight of the amount kept by the sieve was determined. The results have been summarized in the table below.

| Type of molasses in the brown sugar | Caking, % by weight * |
|---|---|
| Non treated molasses | 34 |
| Non treated molasses, 5% maltodextrin | 4 |
| Membrane filtrated molasses according to example 5 | 0 |

* average from 4 samples

The experiment thus shows that only a membrane filtrated molasses according to the invention will give free-flowing brown sugar.

We claim:

1. A process for manufacturing a high molecular weight molasses product having improved drying properties, which comprises:

feeding starting material molasses having a RT value of 8–45% and a color of at least 100.000 ICUMSA units to a membrane filtering plant having an inert membrane having a nominal cut off value of at least 2,000 dalton; and filtering a low molecular weight fraction as a permeate from a high molecular weight fraction as a retentate, and collecting said high molecular weight fraction having a color of at least two times the color of the starting molasses or at least 200.000 ICUMSA units.

2. The process according to claim 1, comprising continuing filtering until the retentate is 2.5–3.0 times the color of the starting molasses.

3. The process according to claims 1 or 2, wherein said starting molasses has a RT value of 10–20%, and a color of at least 180.000 ICUMSA units.

4. The process according to claims 1 or 2, wherein said membrane is selected form the group consisting of a polysulfone, polyethersulfone or an aromatic polyamide.

5. The process according to claims 1 or 2, wherein said membrane has a nominal cut off value of at least 5,000 dalton.

6. The process according to claim 5, wherein the filtering is performed at a pressure of about 10 bar.

7. The process according to claims 1 or 2, comprising continuing filtering until the content of fructose in the retentate is halved in relation to the content of fructose in the starting molasses.

8. A method of making a dry molasses product which comprises spray-drying a molasses product obtained according to the process of claim 1.

9. A method of making a free-flowing brown sugar which comprises adding refined sugar to the molasses product obtained according to the process of claim 1.

10. A method of making a low-calorie food product which comprises adding to said low-calorie food product a coloring and/or flavoring amount of the molasses product obtained according to the process of claim 1.

* * * * *